US011498361B2

(12) United States Patent
Yu et al.

(10) Patent No.: US 11,498,361 B2
(45) Date of Patent: Nov. 15, 2022

(54) AXLE HOUSING ASSEMBLY HAVING A SPINDLE AND METHOD OF MANUFACTURE

(71) Applicant: ArvinMeritor Technology, LLC, Troy, MI (US)

(72) Inventors: Kenneth Yu, Troy, MI (US); Joseph Melekian, Troy, MI (US); Srinivasa Perumal Rengasamy, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/170,228

(22) Filed: Feb. 8, 2021

(65) Prior Publication Data

US 2022/0250411 A1 Aug. 11, 2022

(51) Int. Cl.
*B60B 35/16* (2006.01)
*B23K 20/12* (2006.01)
*F16H 57/037* (2012.01)
*B23K 9/16* (2006.01)
B23K 101/00 (2006.01)
F16H 57/02 (2012.01)

(52) U.S. Cl.
CPC ........... *B60B 35/16* (2013.01); *B23K 9/16* (2013.01); *B23K 20/12* (2013.01); *F16H 57/037* (2013.01); *B23K 2101/006* (2018.08); *B60B 2310/3023* (2013.01); *B60B 2310/3025* (2013.01); *B60B 2900/212* (2013.01); *B60B 2900/321* (2013.01); *B60B 2900/711* (2013.01); *F16H 2057/02052* (2013.01)

(58) Field of Classification Search
CPC ............ B60B 35/16; B60B 2310/3023; B60B 2310/3025; B23K 9/16; B23K 20/12; B23K 2101/006; F16H 57/037; F16H 2057/02052
See application file for complete search history.

(56) References Cited

U.S. PATENT DOCUMENTS

| 3,273,233 | A | * | 9/1966 | Oberle | B23K 20/12 228/155 |
| 3,535,002 | A | * | 10/1970 | Stamm | B60B 35/16 301/124.1 |
| 4,659,005 | A | | 4/1987 | Spindler | |
| 4,760,755 | A | | 8/1988 | Peck | |
| 9,713,854 | B2 | * | 7/2017 | Zhai | B23K 20/129 |
| 2007/0228810 | A1 | | 10/2007 | Pochatila et al. | |
| 2018/0117965 | A1 | | 5/2018 | Gregg et al. | |

FOREIGN PATENT DOCUMENTS

EP  2960004 A1  12/2015

OTHER PUBLICATIONS

U.S. Appl. No. 16/779,224, filed Jan. 31, 2020; 37 pages.
Extended European Search Report dated May 25, 2022 for related European Appln. No. 22155257.3; 7 Pages.
India First Examination Report for Indian Application No. 202214003484, dated Aug. 18, 2022, 5 Pages.

* cited by examiner

*Primary Examiner* — Thomas C Diaz
(74) *Attorney, Agent, or Firm* — Brooks Kushman PC

(57) ABSTRACT

An axle housing assembly and a method of manufacture. A friction weld may join a spindle to an arm portion of the axle housing assembly. An extension weld may encircle the arm portion. The extension weld may extend from the friction weld in a direction that may extend away from the spindle.

20 Claims, 7 Drawing Sheets

AXLE HOUSING ASSEMBLY HAVING A SPINDLE AND METHOD OF MANUFACTURE

TECHNICAL FIELD

This disclosure relates to an axle housing assembly that has a spindle and a method of manufacture.

BACKGROUND

A system and method of friction welding a workpiece is disclosed in U.S. Pat. No. 9,713,854.

SUMMARY

In at least one embodiment, an axle housing assembly is provided. The axle housing assembly may include an arm portion, a spindle, a friction weld, and an extension weld. The arm portion may extend around an axis. The spindle may extend from the arm portion. The friction weld may extend around the axis and may join the spindle to the arm portion. The extension weld may encircle the arm portion and may extend from the friction weld in a direction that extends away from the spindle.

In at least one embodiment a method of making an axle housing assembly is provided. The method may include friction welding a spindle to an end of an arm portion that extends around an axis. An external curl that is generated when the spindle is friction welded to the arm portion may be removed. An extension weld that encircles the arm portion may be provided after removing the external curl. The extension weld may extend from the friction weld in a direction that extends away from the spindle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
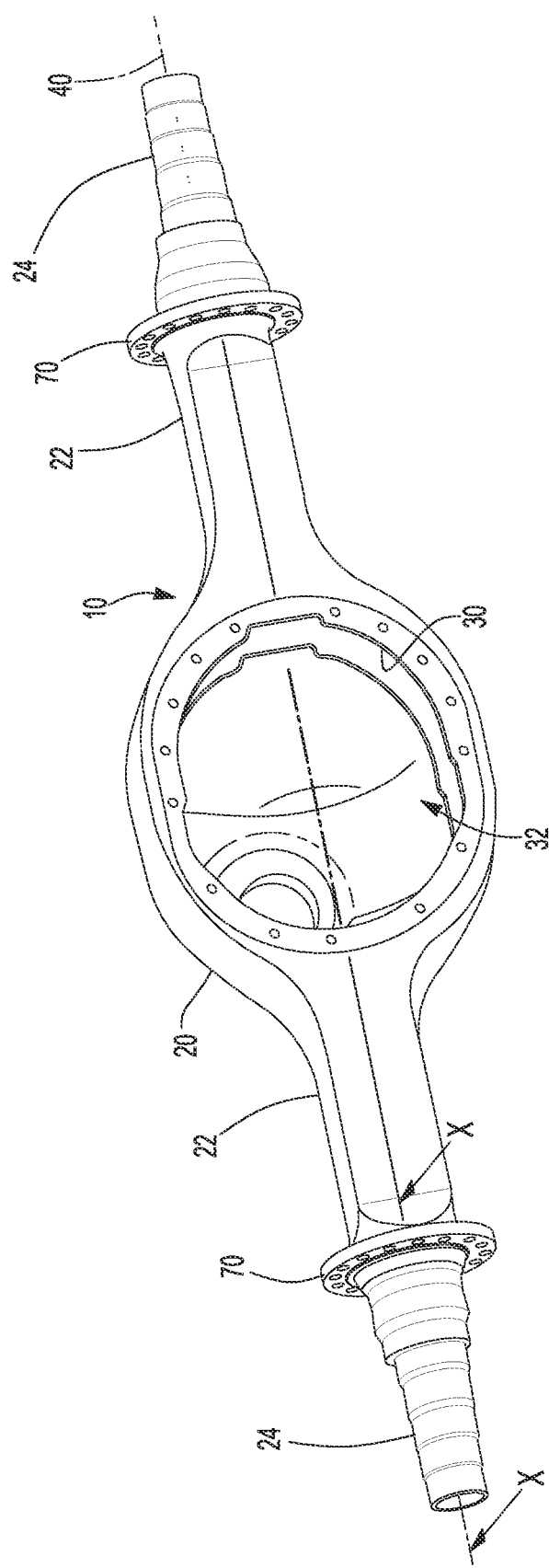
FIG. 1 is a perspective view of an example of an axle housing assembly.

Referring to FIG. 1, an example of an axle housing assembly 10 is shown. The axle housing assembly 10 may be part of an axle assembly. The axle assembly may be part of a vehicle drivetrain that may provide torque to one or more traction wheel assemblies that may include a tire mounted on a wheel. An axle assembly may be provided with a vehicle like a truck, bus, farm equipment, mining equipment, military transport or weaponry vehicle, or cargo loading equipment for land, air, or marine vessels. The vehicle may include a trailer for transporting cargo in one or more embodiments.

Figure 7:
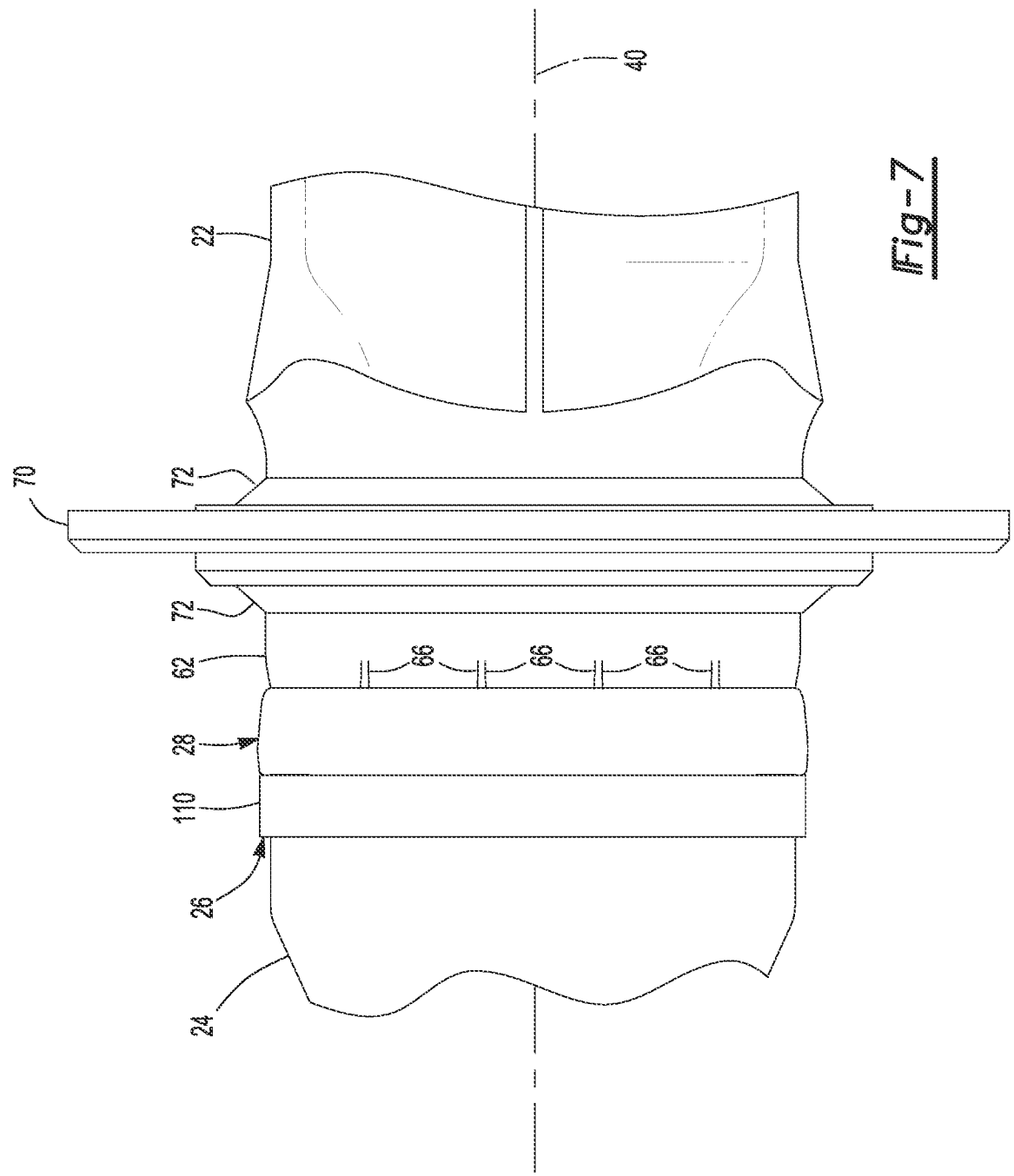
FIG. 7 is a side view of the portion of the axle housing assembly in FIG. 6.

The axle housing assembly 10 may facilitate mounting of the axle assembly to the vehicle. In addition, the axle housing assembly 10 may receive various components of the axle assembly. For instance, the axle housing assembly 10 may at least partially receive a differential assembly and one or more axle shafts. In at least one configuration, the axle housing assembly 10 may include a center portion 20, at least one arm portion 22, and at least one spindle 24. The axle housing assembly 10 may also include a friction weld 26 and an extension weld 28, which are best shown in FIG. 7.

Referring to FIG. 1, the center portion 20 may be disposed proximate the center of the axle housing assembly 10. The center portion 20 may define an opening 30 and a cavity 32 that may receive a differential assembly. For example, a differential carrier that supports the differential assembly may be mounted to the center portion 20 such that a portion of the differential carrier may extend through the opening 30 and the differential assembly may be received inside the cavity 32. A lower region of the center portion 20 may at least partially define a sump portion that may contain lubricant.

One or more arm portions 22 may extend from the center portion 20. For example, two arm portions 22 may extend in opposite directions from the center portion 20 and away from the cavity 32. An arm portion 22 may be configured to receive an axle shaft. For instance, an arm portion 22 may have a hollow configuration or tubular configuration that may extend around a corresponding axle shaft and may help separate or isolate the axle shaft from the surrounding environment. The arm portion 22 may also extend around an axis 40. The axle shaft and/or a vehicle wheel may be rotatable about the axis 40. An arm portion 22 or a portion thereof may be integrally formed with the center portion 20. Alternatively, an arm portion 22 may be separate from the center portion 20. In such a configuration, each arm portion 22 may be attached to the center portion 20 in any suitable manner, such as by welding or with one or more fasteners.

Figure 2:
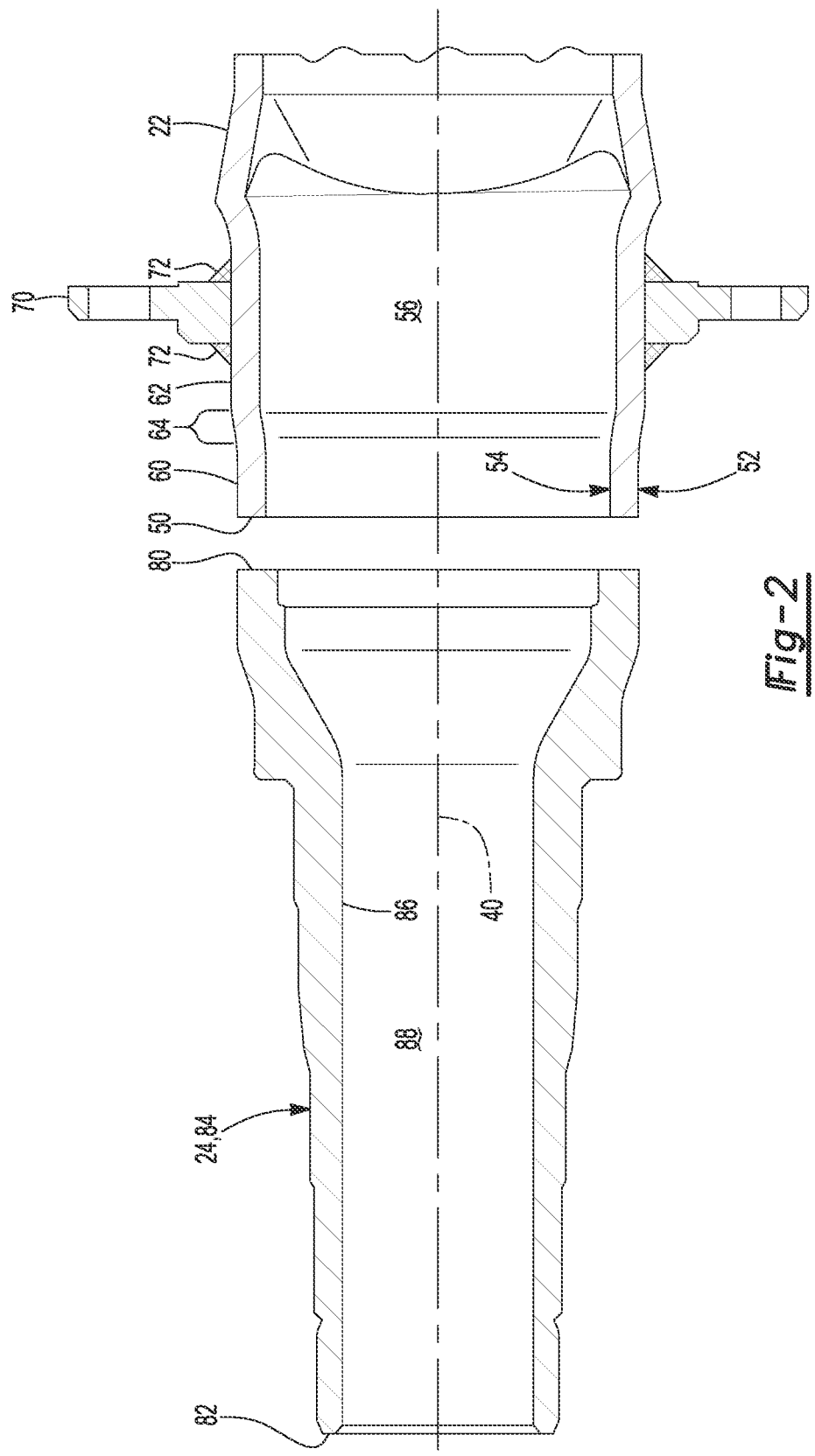
FIG. 2 is a section view along section line X-X showing an examples of a spindle and an arm portion prior to being joined.

Referring to FIG. 2, an end region of the arm portion 22 is shown. The arm portion 22 may include an arm portion end surface 50, an exterior side 52, an interior side 54, and an arm portion cavity 56.

The arm portion end surface 50 may be disposed at a distal end of the arm portion 22 that may face away from and may be disposed opposite the center portion 20. In at least one configuration, the arm portion end surface 50 may extend around and may be disposed substantially perpendicular to the axis 40.

Figure 5:
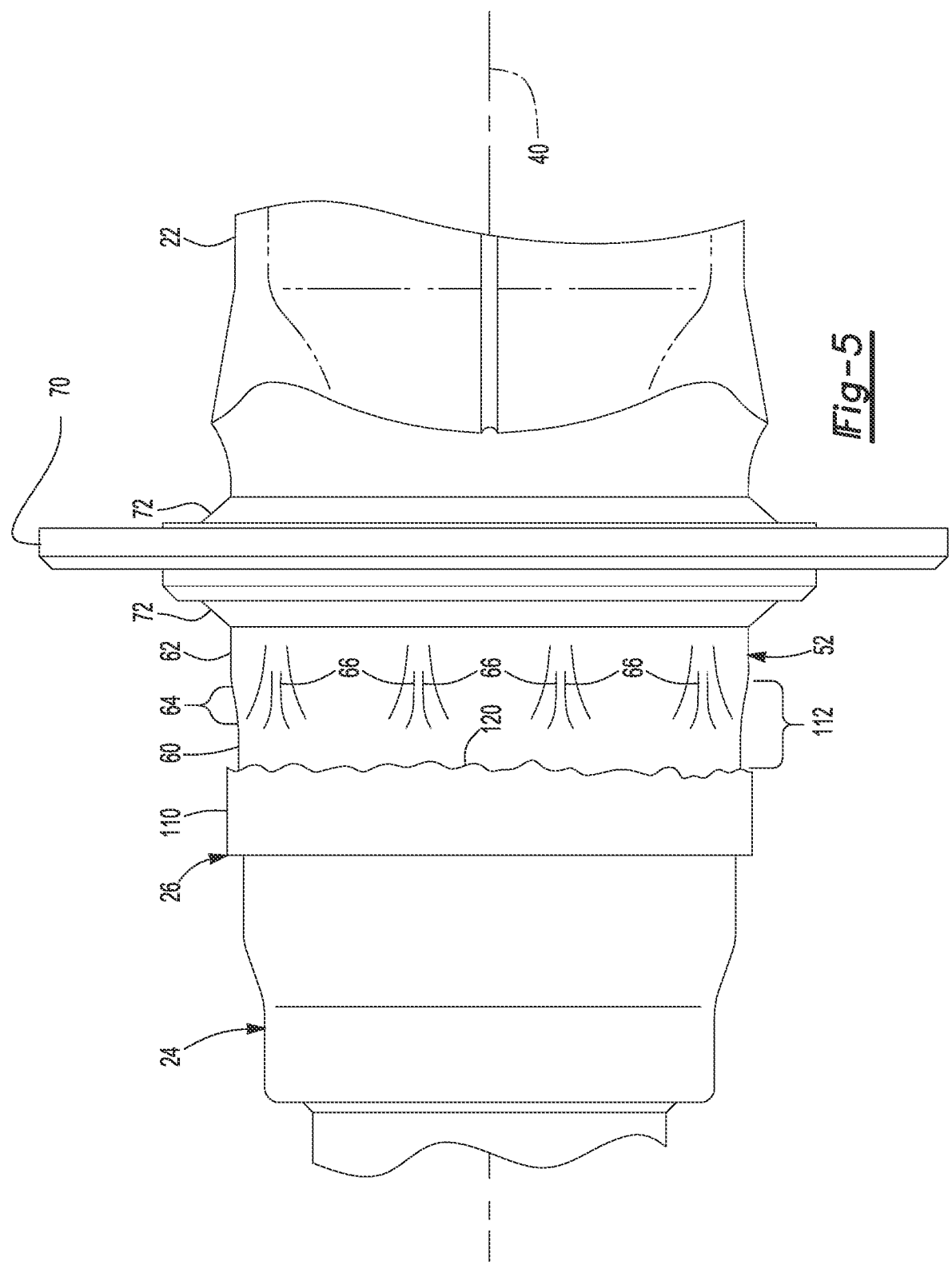
FIG. 5 is a magnified side view of a portion of the axle housing assembly in FIG. 4.

The exterior side 52 may face away from the axis 40. The exterior side 52 may extend from the arm portion end surface 50 toward the center portion 20 or to the right from the perspective shown. The exterior side 52 may include one or more exterior surfaces that may be disposed at various distances from the axis 40. In at least one configuration and as is best shown with reference to FIG. 2, the exterior side 52 may include a first exterior surface 60, a second exterior surface 62, a tapered surface 64, or combinations thereof. As is best shown in FIG. 5, one or more swage marks 66 may be provided on the exterior side 52.

The first exterior surface 60 may extend from the arm portion end surface 50 to an end of the tapered surface 64. In at least one configuration, the first exterior surface 60 may have a constant or substantially constant outside diameter.

The second exterior surface 62 may be disposed on an opposite side of the tapered surface 64 from the first exterior surface 60. For instance, the second exterior surface 62 may extend from an end of the tapered surface 64 that is disposed opposite the first exterior surface 60 toward the center portion 20. As such, the second exterior surface 62 may be spaced apart from the first exterior surface 60. The second exterior surface 62 may have a larger outside diameter than the first exterior surface 60.

The tapered surface 64 may extend between the first exterior surface 60 and the second exterior surface 62. For instance, the tapered surface 64 may extend from an end of the first exterior surface 60 to an end of the second exterior surface 62. The tapered surface 64 may be tapered toward the axis 40 in an axial direction that extends toward the spindle 24 and the arm portion end surface 50 or to the left from the perspective shown. For example, the tapered surface 64 may become progressively closer to the axis 40 in a direction that extends from the second exterior surface 62 toward the first exterior surface 60.

Referring to FIG. 5, one or more swage marks 66 may be provided with the exterior side 52 of the arm portion 22. A swage mark 66 may be formed by a tool when the arm portion 22 is formed or swaged to reduce the diameter of the arm portion 22 proximate the arm portion end surface 50. For instance, during fabrication of the arm portion 22, the exterior side 52 of the arm portion 22 may have a substantially constant diameter from the arm portion end surface 50 to the second exterior surface 62. A portion of the exterior side 52 may be swaged to reduce the outside diameter proximate the arm portion end surface 50 and thereby form the tapered surface 64 and the first exterior surface 60. A swage mark 66 may have any suitable configuration. In the configuration shown, the swage marks 66 are depicted as pairs of slightly splayed lines that generally extend in the same direction as the axis 40. A swage mark 66 may denote where a recess or indentation is formed in the exterior side 52. Alternatively or in addition, material may be raised or may protrude outwardly away from the axis 40 in the narrow area between a pair of splayed lines (e.g., the narrow area between the convex sides of a pair of swage marks 66 may protrude away from the axis with respect to the tapered surface 64. A swage mark 66 may be formed in at least a portion of the tapered surface 64 and may optionally extend to and may be formed in the first exterior surface 60, the second exterior surface 62, or both.

Referring to FIG. 2, the interior side 54 may be disposed opposite the exterior side 52. As such, the interior side 54 may face toward the axis 40. The interior side 54 may extend from the arm portion end surface 50 to the center portion 20 and may at least partially define the arm portion cavity 56.

The arm portion cavity 56 may extend from the cavity 32 of the center portion 20, which is shown in FIG. 1, to the arm portion end surface 50. An axle shaft may extend through the arm portion cavity 56.

Referring to FIGS. 1 and 2, a brake mounting flange 70 may be provided with the arm portion 22 to facilitate mounting of a brake assembly. The brake mounting flange 70 may be axially positioned or positioned along the axis 40 between the center portion 20 and the arm portion end surface 50. For instance, the brake mounting flange 70 may encircle and may be disposed on the second exterior surface 62. The brake mounting flange 70 may be secured to the arm portion 22 in any suitable manner, such as with one or more weld seams 72.

Figure 3:
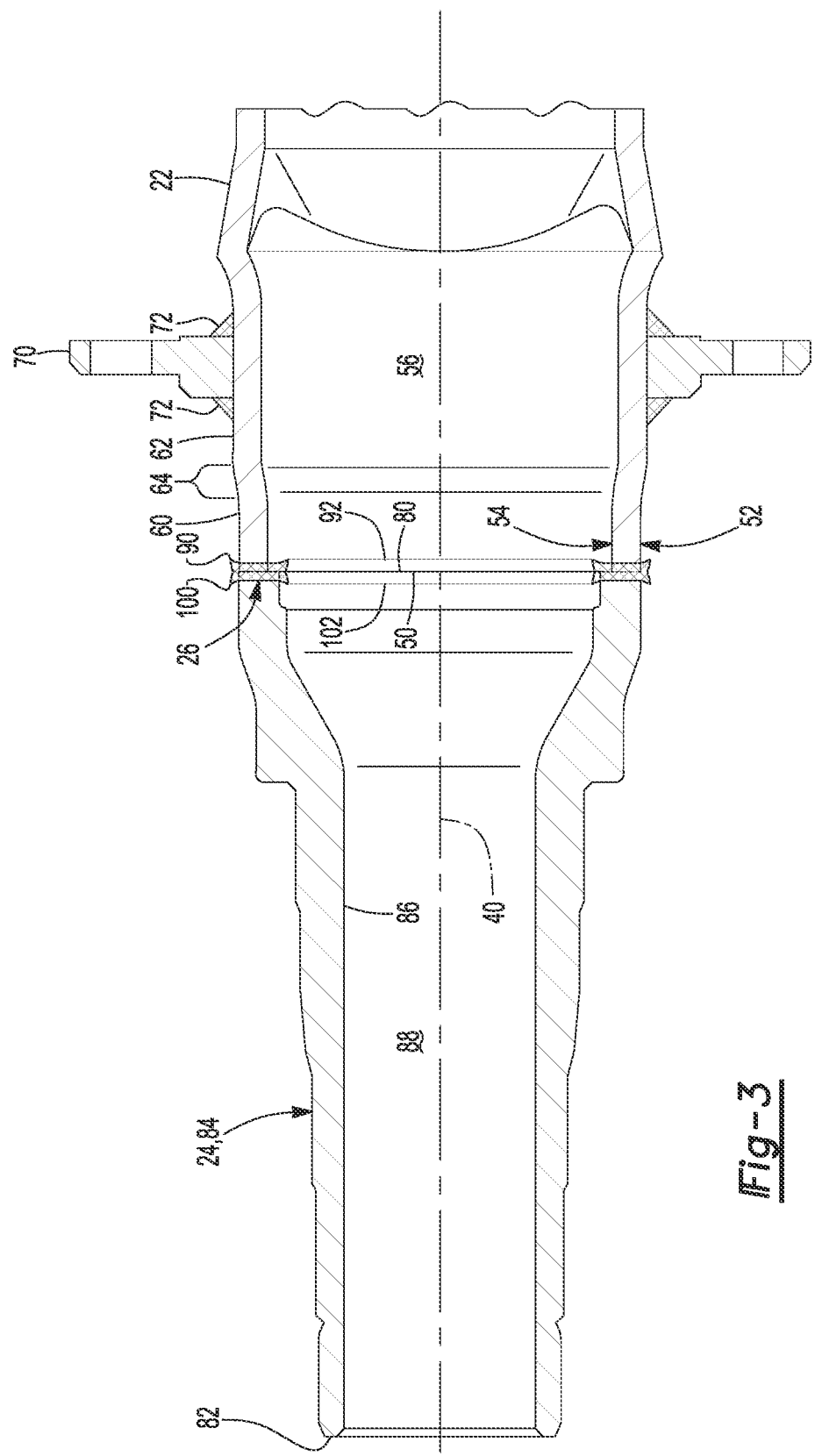
FIG. 3 is a section view showing the spindle friction welded to the arm portion.

Referring to FIGS. 1-3, the spindle 24 may extend from a corresponding arm portion 22. For example, the spindle 24 may extend along or around the axis 40 and may extend from the arm portion end surface 50 in a direction that extends away from the center portion 20. The spindle 24 may be configured to support a wheel hub of a wheel end assembly. For instance, the spindle 24 may be received inside one or more wheel bearings that may rotatably support the wheel hub. The wheel hub may be rotatable about the axis 40 and may facilitate mounting of a wheel upon which a tire may be disposed. In at least one configuration, the spindle 24 may include a first spindle end 80, a second spindle end 82, an exterior spindle side 84, an interior spindle side 86, a spindle hole 88, or combinations thereof. These features are best shown with reference to FIGS. 2 and 3.

The first spindle end 80, which may also be referred to as a first spindle end surface, may be disposed proximate the arm portion 22. For example, the first spindle end 80 may face toward and may contact or engage the arm portion end surface 50 of an arm portion 22. In at least one configuration, the first spindle end 80 may be disposed substantially parallel to the arm portion end surface 50 and may be disposed substantially perpendicular to the axis 40.

The second spindle end 82, which may also be referred to as a second spindle end surface, may be disposed opposite the first spindle end 80. As such, the second spindle end 82 may face away from the arm portion 22. The second spindle end 82 may be a distal end surface of the axle housing assembly 10.

The exterior spindle side 84 may face away from the axis 40. The exterior spindle side 84 may extend from the first spindle end 80 to the second spindle end 82 and may include one or more exterior surfaces that may be disposed at various distances from the axis 40. One or more wheel bearings may engage or contact the exterior spindle side 84.

The interior spindle side 86, which is provided when the spindle 24 is hollow, may be disposed opposite the exterior spindle side 84. As such, the interior spindle side 86 may face toward the axis 40. The interior spindle side 86 may extend from the first spindle end 80 to the second spindle end 82 and may at least partially define the spindle hole 88.

Referring to FIGS. 2-7, an example of a method of manufacturing an axle housing assembly 10 is shown. FIGS. 2-4 and 6 are section views along section line X-X and axis 40 at different steps in the manufacturing process. FIGS. 5 and 7 are side views rather than section views.

Referring to FIG. 2, the spindle 24 and a portion of the arm portion 22 are shown prior to attaching the spindle 24 to the arm portion 22.

Referring to FIG. 3, the spindle 24 is shown after being friction welded to the arm portion 22. During friction welding, at least one of the spindle 24 and the arm portion 22 may be rotated about the axis 40 and then the first spindle end 80 may be engaged with the arm portion end surface 50 under an axial load. The friction between the first spindle end 80 and the arm portion end surface 50 may generate heat that may partially melt the spindle 24 and the arm portion 22, thereby producing the friction weld 26. The friction weld 26 may extend continuously around the axis 40 and may join the spindle 24 to the arm portion 22.

Axial loading during friction welding may generate curls on the arm portion 22 and the spindle 24. The curls, which may also be called friction weld curls, may extend outwardly from the friction weld 26 and may protrude from the arm portion 22 and the spindle 24. For example, a first external curl 90 and a first internal curl 92 may be primarily generated from the arm portion 22 while a second external curl 100 and a second internal curl 102 may be primarily generated from the spindle 24. The first external curl 90 and the second external curl 100 may extend away from the axis 40 and may curl away from each other. The first internal curl 92 and the second internal curl 102 may extend toward the axis 40, may be disposed inside the arm portion cavity 56 and the spindle hole 88, and may curl away from each other. The first and second external curls 90, 100 and the first and second internal curls 92, 102 may extend in continuous rings around the axis 40 and may increase in size as friction welding proceeds. Rotation of the spindle 24 and/or the arm portion 22 and axial loading may be terminated when the friction weld 26 is complete.

Figure 4:
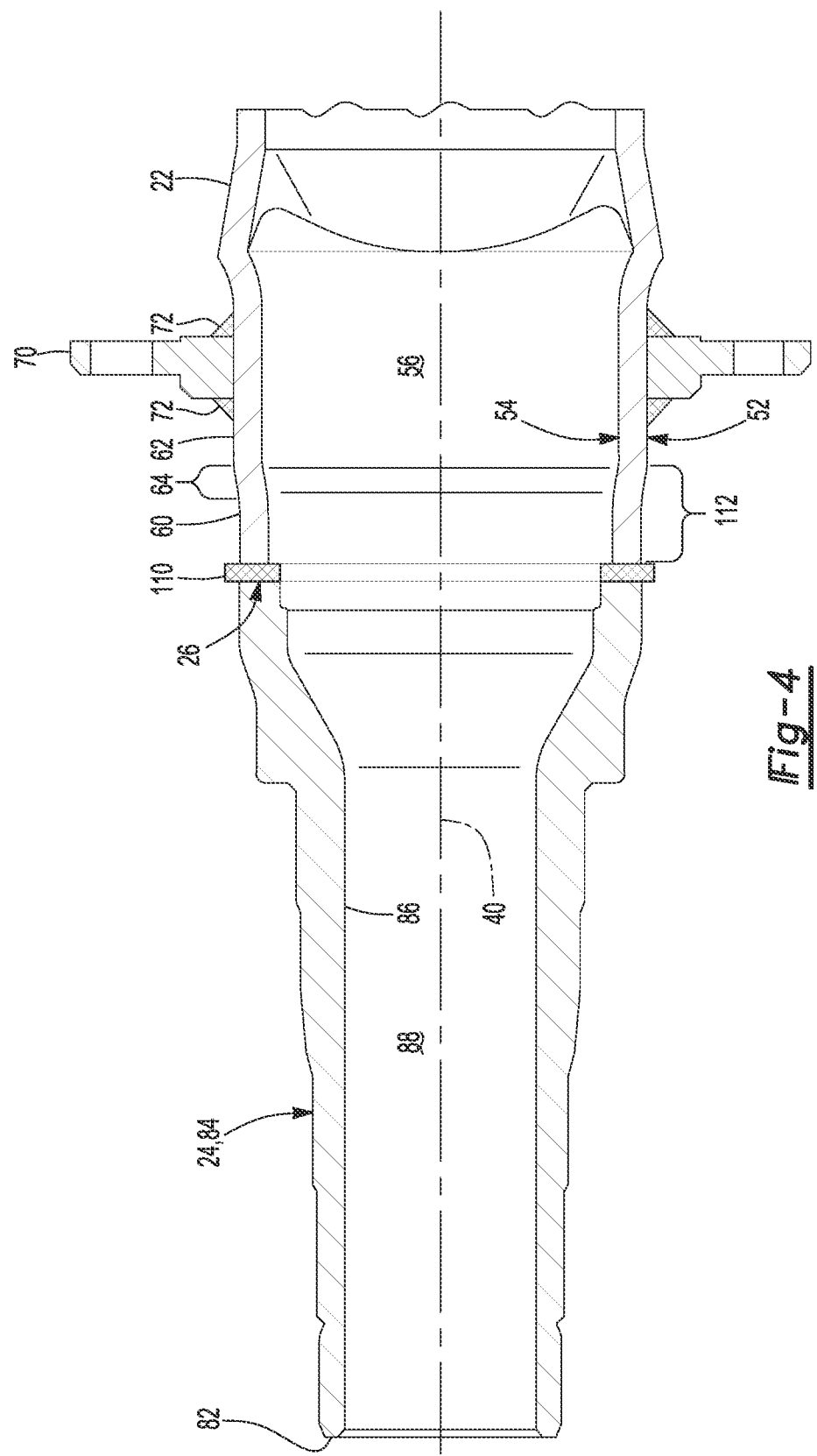
FIG. 4 is a section view after removing curls that are generated when the spindle is friction welded to the arm portion.

Referring to FIGS. 4 and 5, one or more curls may be removed after the spindle 24 is friction welded to the arm portion 22. For example, a cutting tool may sever the first external curl 90 and the second external curl 100 from the friction weld 26 while another cutting tool may sever the first internal curl 92 and the second internal curl 102 from the friction weld 26. Removing the first external curl 90 and the second external curl 100 may create a ring surface 110. The ring surface 110 may extend continuously around the axis 40. In addition, the ring surface 110 may be disposed substantially parallel to the axis 40.

In at least one configuration, the ring surface 110 may protrude outwardly or in a direction that extends away from the axis 40 with respect to the arm portion 22, the spindle 24, or both. For instance, the ring surface 110 may be disposed further from the axis 40 than an adjacent portion of the exterior side 52, such as the first exterior surface 60, may be disposed further from the axis 40 than an adjacent portion of the exterior spindle side 84, or both. As such, the friction weld 26 may cooperate with the arm portion 22 to create a recess 112. The recess 112 may encircle the arm portion 22 and may extend in an axial direction between the friction weld 26 and the second exterior surface 62. In at least one configuration, the recess 112 may be defined by the friction weld 26, the first exterior surface 60, and at least a portion of the tapered surface 64.

As is best shown in FIG. 5, removing the external curls may produce at least one uneven jagged edge 120 on the friction weld 26. The jagged edge 120 may encircle the axis 40 and may be disposed at an end of the ring surface 110 that faces toward the arm portion 22. The jagged edge 120 and/or the swage marks 66 may create a high stress concentration zone in the arm portion 22 between the jagged edge 120 and the brake mounting flange 70 where one or more fatigue cracks may be susceptible to initiating or forming. Removing more material from the friction weld 26 adjacent surfaces of the arm portion 22 and/or the spindle 24 may eliminate the jagged edge 120 and create a smoother transition but may also decrease the outside diameter and wall thickness in this area, which may reduce of the strength of the axle housing assembly 10. Rather than removing material to eliminate the jagged edge 120, the extension weld 28 is provided.

Figure 6:
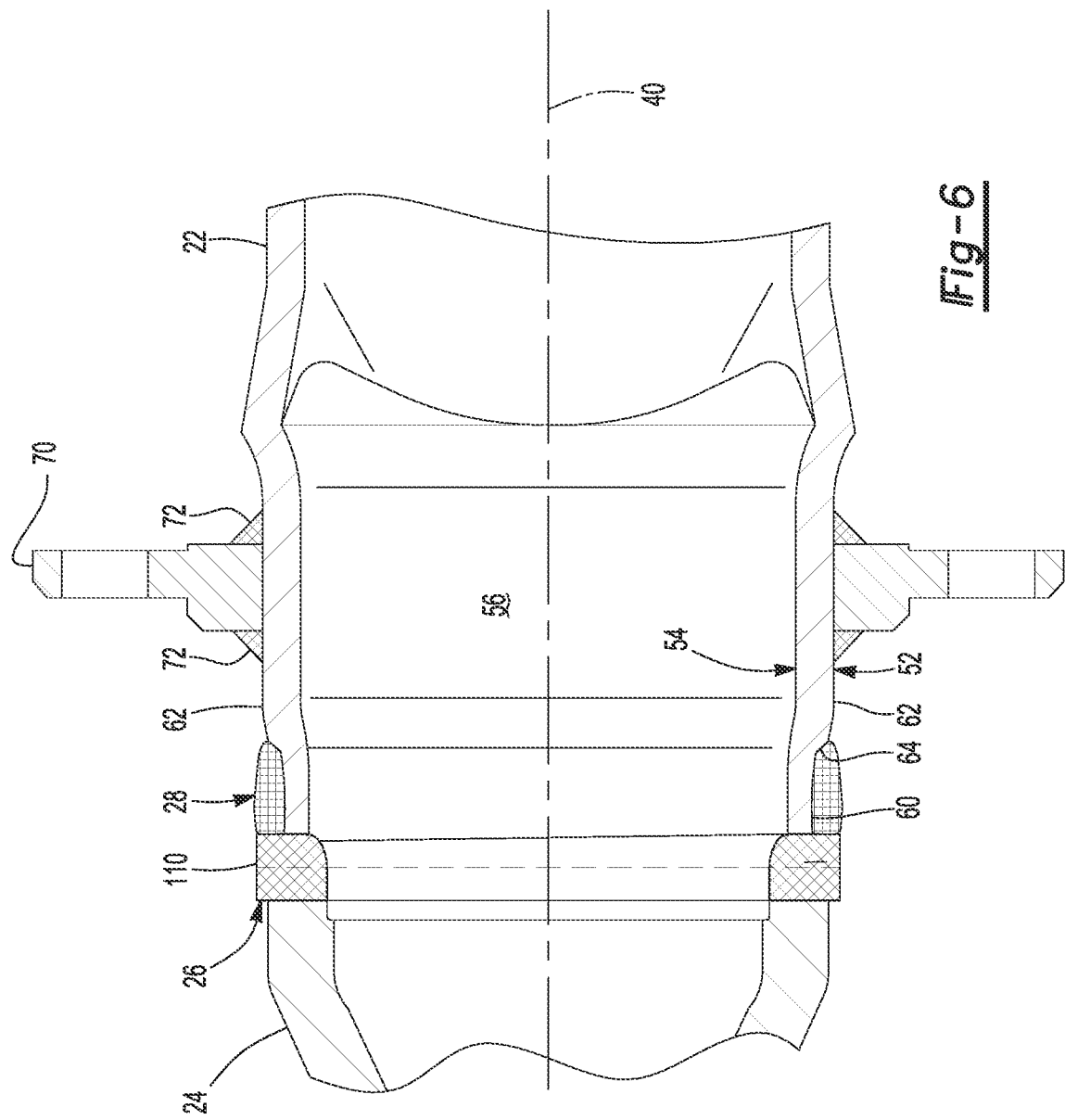
FIG. 6 is a section view of the portion of the axle housing assembly after adding an extension weld.

Referring to FIGS. 6 and 7, the extension weld 28 is provided after removing the external curls. The extension weld 28 may be provided by any suitable welding technique or additive fusion technique that may add sufficient material to form the extension weld 28. For instance, the extension weld 28 may be provided by metal inert gas (MIG) welding.

The extension weld 28 may encircle or extend continuously around the arm portion 22. Moreover, the extension weld 28 may not extend to the interior side 54 of the arm portion 22 and thus may be spaced apart from the arm portion cavity 56. As such, the extension weld 28 may extend partially but not completely through the arm portion 22. In addition, the extension weld 28 may extend in an axial direction from the friction weld 26 in a direction that may extend away from the spindle 24. For instance, the extension weld 28 may extend from the friction weld 26 to the tapered surface 64 and optionally to the second exterior surface 62. The extension weld 28 may partially or completely fill the recess 112 as is best shown by comparing FIGS. 5 and 6. Accordingly, the extension weld 28 may increase the wall thickness or effective wall thickness of the arm portions 22 between the friction weld 26 and the tapered surface 64 or between the friction weld 26 and the second exterior surface 62. The extension weld 28 may or may not be aligned with the ring surface 110. For instance, the extension weld 28 or a portion thereof may extend further from the axis 40 than the ring surface 110 in one or more configurations.

The extension weld 28 may consume the jagged edge 120. As such, the extension weld 28 may eliminate the jagged edge 120 without employing machining operations to remove material from the arm portion 22, the spindle 24, or the friction weld 26, and may reduce or eliminate stress concentrations in the arm portion 22 that are associated with the jagged edge 120, thereby preventing or reducing associated fatigue cracks.

Referring to FIG. 7, the extension weld 28 may also partially or fully cover or encapsulate one more swage marks 66. For instance, the extension weld 28 may fill or partially fill a swage mark that is configured as an indentation, which may increase the effective wall thickness adjacent to a swage mark 66 and may reduce stress concentrations in the arm portion 22 that are associated with the swage mark 66, thereby preventing or reducing associated fatigue cracks.

An axle housing assembly as described above may have better fatigue performance and improved durability and expected life as compared to an axle housing assembly that lacks an extension weld. Improved durability may allow an axle housing assembly to accommodate or withstand higher loads. Moreover, higher loads may be accommodated using in existing axle housing assembly design rather than by redesigning an axle housing assembly and incurring associated design costs, testing costs, and tooling costs and without using more expensive or heavier materials. These benefits may be more significant when designing a new axle housing assembly is not financially feasible, such as when axle housing assembly manufacturing volumes are low.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle housing assembly comprising:
an arm portion that extends around an axis;
a spindle that extends around the axis and that extends from the arm portion;

a friction weld that extends around the axis and that joins the spindle to the arm portion; and an extension weld that encircles the arm portion and that extends from the friction weld in a direction that extends away from the spindle, wherein the extension weld includes additional material added to the arm portion and does not include material of a curl that extends from the friction weld.

2. The axle housing assembly of claim 1 wherein the friction weld protrudes from the spindle.

3. The axle housing assembly of claim 1 wherein the extension weld at least partially fills a swage mark in the arm portion that extends from an exterior side of the arm portion toward the axis.

4. The axle housing assembly of claim 3 wherein the arm portion has a tapered surface that faces away from the axis and that is tapered toward the axis in an axial direction that extends toward the spindle, wherein the swage mark extends from the tapered surface toward the axis.

5. The axle housing assembly of claim 4 wherein the extension weld extends axially from the friction weld to the tapered surface.

6. The axle housing assembly of claim 4 wherein the tapered surface extends from a first exterior surface of the arm portion to a second exterior surface of the arm portion, the first exterior surface extending from the friction weld to the tapered surface and having a smaller diameter than the second exterior surface, wherein the extension weld extends axially from the friction weld to the second exterior surface.

7. The axle housing assembly of claim 4 wherein the extension weld increases a wall thickness of the arm portion between the extension weld and the tapered surface.

8. A method of making an axle housing assembly comprising:
friction welding a spindle to an arm portion end surface of an arm portion, the arm portion end surface extending around an axis;
removing an external curl that is generated when the spindle is friction welded to the arm portion, wherein removing the external curl includes severing the external curl from the friction weld; and
providing an extension weld that encircles the arm portion after removing the external curl, wherein the extension weld extends from the friction weld in a direction that extends away from the spindle.

9. The method of claim 8 wherein the extension weld is provided by metal inert gas (MIG) welding.

10. The method of claim 8 wherein the arm portion and the extension weld extend from the friction weld in the direction that extends away from the spindle.

11. The method of claim 8 wherein the extension weld at least partially fills a swage mark in the arm portion that extends from an exterior side of the arm portion toward the axis.

12. The method of claim 11 wherein the arm portion has a tapered surface that faces away from the axis and that is tapered toward the axis in an axial direction that extends toward the spindle, and wherein the swage mark extends from the tapered surface.

13. The method of claim 12 wherein the tapered surface extends from a first exterior surface of the arm portion to a second exterior surface of the arm portion, the first exterior surface extending from the friction weld to the tapered surface and having a smaller diameter than the second exterior surface, wherein the extension weld extends from the friction weld to the second exterior surface.

14. The method of claim 12 wherein the extension weld increases a wall thickness of the arm portion between the extension weld and the tapered surface.

15. The method of claim 12 wherein the extension weld fills a recess that encircles the arm portion and that extends between the friction weld and the tapered surface.

16. The method of claim 8 wherein removing the external curl creates a ring surface that extends continuously around the axis and that is disposed substantially parallel to the axis.

17. A method of making an axle housing assembly comprising:
friction welding a spindle to an arm portion end surface of an arm portion, the arm portion end surface extending around an axis;
removing an external curl that is generated when the spindle is friction welded to the arm portion; and
providing an extension weld that encircles the arm portion after removing the external curl, wherein the extension weld extends from the friction weld in a direction that extends away from the spindle, wherein the friction weld protrudes from the spindle and from the arm portion after removing the external curl and wherein removing the external curl creates a ring surface that extends continuously around the axis such that the ring surface is disposed further from the axis than the spindle and an adjacent portion of the arm portion.

18. The method of claim 17 wherein removing the external curl produces a jagged edge on the friction weld and wherein the extension weld consumes the jagged edge.

19. The method of claim 18 wherein the jagged edge encircles the axis and is disposed at an end of the ring surface that faces toward the arm portion.

20. The method of claim 18 wherein consuming the jagged edge and at least partially filling a swage mark in the arm portion reduces stress concentration in the arm portion.

* * * * *